US012361879B2

(12) United States Patent
Lee et al.

(10) Patent No.: US 12,361,879 B2
(45) Date of Patent: Jul. 15, 2025

(54) DISPLAY DEVICE CONFIGURED TO GENERATE A DATA SIGNAL BASED ON A PIXEL DRIVE VOLTAGE, DISPLAY SYSTEM, AND DRIVING METHOD OF DISPLAY DEVICE

(71) Applicant: SAMSUNG ELECTRONICS CO., LTD., Suwon-si (KR)

(72) Inventors: Choonghoon Lee, Suwon-si (KR); Sung-Jin Park, Suwon-si (KR); Sangwoo Bae, Suwon-si (KR); Seung-Hoon Baek, Suwon-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 0 days.

(21) Appl. No.: 18/404,179

(22) Filed: Jan. 4, 2024

(65) Prior Publication Data

US 2025/0006123 A1 Jan. 2, 2025

(30) Foreign Application Priority Data

Jun. 29, 2023 (KR) ........................ 10-2023-0084176

(51) Int. Cl.
*G09G 3/3233* (2016.01)

(52) U.S. Cl.
CPC ... *G09G 3/3233* (2013.01); *G09G 2300/0819* (2013.01); *G09G 2300/0842* (2013.01); *G09G 2320/0233* (2013.01); *G09G 2320/0673* (2013.01); *G09G 2330/028* (2013.01); *G09G 2330/08* (2013.01); *G09G 2330/12* (2013.01); *G09G 2354/00* (2013.01)

(58) Field of Classification Search
None
See application file for complete search history.

(56) References Cited

U.S. PATENT DOCUMENTS

| | | | | |
|---|---|---|---|---|
| 7,106,321 | B2 | 9/2006 | Morita | |
| 8,154,196 | B2 | 4/2012 | Lee | |
| 8,766,971 | B2 | 7/2014 | Park et al. | |
| 11,062,649 | B2 | 7/2021 | Kim et al. | |
| 2012/0127145 | A1* | 5/2012 | Jang | G09G 3/20 345/204 |
| 2013/0321494 | A1 | 12/2013 | Takaki | |
| 2016/0365037 | A1* | 12/2016 | Gu | G09G 3/3258 |
| 2017/0195658 | A1* | 7/2017 | Jung | G09G 3/3233 |
| 2017/0365217 | A1* | 12/2017 | An | G09G 3/3266 |
| 2020/0211457 | A1* | 7/2020 | Kim | G09G 3/3233 |
| 2024/0203333 | A1* | 6/2024 | Kim | G09G 3/3208 |

FOREIGN PATENT DOCUMENTS

| | | |
|---|---|---|
| JP | 2003-050565 | 2/2003 |
| KR | 10-2016-0007758 | 1/2016 |

* cited by examiner

*Primary Examiner* — Kirk W Hermann
(74) *Attorney, Agent, or Firm* — Fish & Richardson P.C.

(57) ABSTRACT

A display device includes a pixel array that includes a pixel including a light emitting diode and a first transistor that includes a source terminal to which a pixel drive voltage is applied and a gate terminal to which a data signal is applied, and outputs drive current generated based on the voltage difference between the gate terminal and the source terminal, to the light emitting diode, and a display driver IC that generates the data signal based on the pixel drive voltage.

16 Claims, 14 Drawing Sheets

1000

1000

1000

3000

DISPLAY DEVICE CONFIGURED TO GENERATE A DATA SIGNAL BASED ON A PIXEL DRIVE VOLTAGE, DISPLAY SYSTEM, AND DRIVING METHOD OF DISPLAY DEVICE

CROSS-REFERENCE TO RELATED APPLICATION

This application claims priority to and the benefit of Korean Patent Application No. 10-2023-0084176 filed in the Korean Intellectual Property Office on Jun. 29, 2023, the entire contents of which is incorporated herein by reference.

TECHNICAL FIELD

The present disclosure relates to a display device, a display system, and a driving method of the display device.

BACKGROUND

To keep up with the development of information and communication technologies, electronic devices such as automobile devices, smart phones, and artificial reality systems include display devices for conveying information on images to users. As the amount of data required to be processed to provide information on images increases, high-performance display devices are in demand.

Display devices may generate and emit light, using various elements. Such display devices may perform various operations in order to improve the qualities of images to be displayed by the display devices.

SUMMARY

The present disclosure attempts to provide a display device, a display system, and a driving method of the display device capable of displaying luminance levels corresponding to gray levels in order to prevent images to be displayed from changing according to a change in a power supply voltage which is supplied to pixels.

In general, aspects of the subject matter described in this specification can be embodied in a display device that includes: a pixel array that includes a pixel including a light emitting diode and a first transistor that includes a source terminal to which a pixel drive voltage is applied and a gate terminal to which a data signal is applied, and outputs drive current generated based on the voltage difference between the gate terminal and the source terminal, to the light emitting diode, and a display driver IC that generates the data signal based on the pixel drive voltage.

Another general aspect can be embodied in a device that includes: a power source that supplies a pixel drive voltage and a circuit drive voltage, a processor that generates first image data and second image data, a first display device which includes a first display driver IC that generates a first data signal based on the first image data, the pixel drive voltage, and the circuit drive voltage, and a first pixel array that displays a first image to one of two eyes, based on the pixel drive voltage and the first data signal, and a second display device which includes a second display driver IC that generates a second data signal based on the second image data, the pixel drive voltage, and the circuit drive voltage, and a second pixel array that displays a second image to the other of the two eyes based on the pixel drive voltage and the second data signal.

Another general aspect can be embodied in a driving method of a display device that includes: applying an input voltage to a display driver IC and applying a pixel drive voltage to the display driver IC and a display panel, a step of generating, by the display driver IC, a data signal based on the input voltage and the pixel drive voltage, and a step of displaying, by the display panel, an image based on the data signal and the pixel drive voltage.

DETAILED DESCRIPTION

Figure 1:
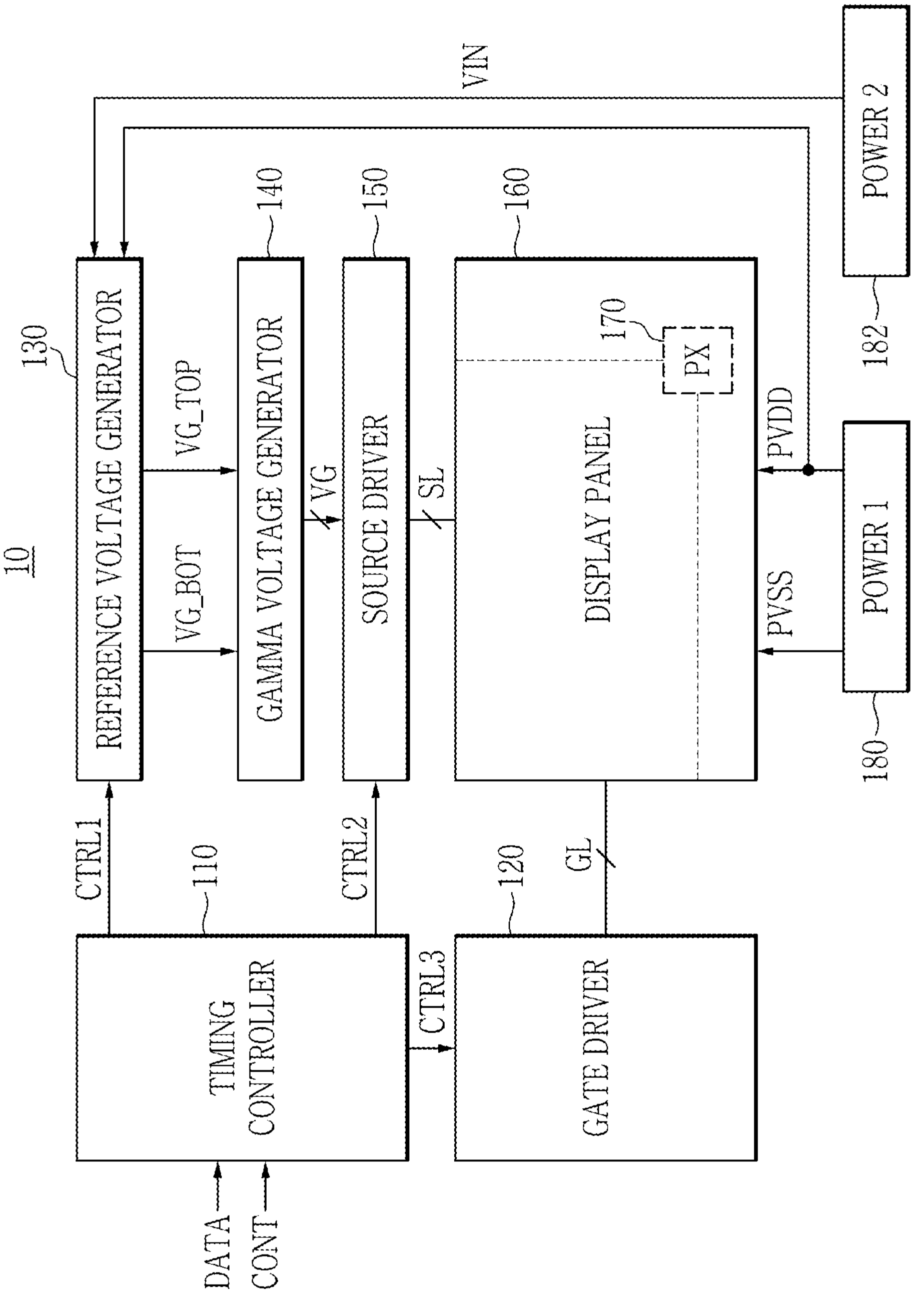
FIG. 1 is a schematic block diagram of an example of a display device.

In the following detailed description, only certain examples of the present disclosure have been shown and described, simply by way of illustration. As those skilled in the art would realize, the described examples may be modified in various different ways, all without departing from the spirit or scope of the present disclosure.

Accordingly, the drawings and description are to be regarded as illustrative in nature and not restrictive. Like reference numerals designate like elements throughout the specification. In the flow charts described with reference to the drawings, the order of operations may be changed, and several operations may be combined, and an operation may be divided, and some operations may not be performed.

Further, expressions written in the singular forms can be comprehended as the singular forms or plural forms unless clear expressions such as “a”, “an”, or “single” are used. Terms including an ordinal number, such as first and second, are used for describing various constituent elements, but the constituent elements are not limited by the terms. The terms are used only to discriminate one constituent element from other constituent elements.

FIG. 1 is a schematic block diagram of a display device.

Referring to FIG. 1, a display device 10 may include a timing controller 110, a gate driver 120, a reference voltage generator 130, a gamma voltage generator 140, a source driver 150, a display panel 160, a first power source (POWER 1) 180, and a second power source (POWER 2) 182. The timing controller 110, the gate driver 120, the reference voltage generator 130, the gamma voltage generator 140, and the source driver 150 may also be referred to a display driver integrated circuit (IC). The gate driver 120 and gate lines GL may also be referred to as a scan driver and scan lines, respectively, and the source driver 150 and source lines SL may also be referred to as a data driver and data lines, respectively.

In some implementations, as shown in FIG. 1, the reference voltage generator 130 and the gamma voltage generator 140 may be implemented as independent driving devices outside the source driver 150. In some implementations, the reference voltage generator 130 and the gamma voltage generator 140 may be implemented inside the source driver 150. In some implementations, the reference voltage generator 130 may be implemented inside the power source 180.

The timing controller 110 may receive an input image signal DATA and an input control signal CONT from an image source such as an external graphics device. The input control signal CONT may be a signal for controlling display of the input image signal DATA, and include a main clock signal, vertical synchronization signal, a horizontal synchronization signal, a data enable signal, etc.

The input image signal DATA may contain luminance information on a plurality of pixels (PX) 170 of the display panel 160, and the luminance may have a predetermined number of gray levels (for example, 1024 ($=2^{10}$), 256 ($=2^8$), or 64 ($=2^6$) gray levels). The display panel 160 may receive gate signals from the gate driver 120 through the plurality of gate lines GL in order to display images. A gate signal may consist of a combination of a scan-on voltage for allowing application of a data signal to the pixels 170 and a scan-off voltage for prohibiting application of a data signal. The vertical synchronization signal of the input control signal CONT may indicate the start field of one frame of an image to which the scan-on voltage is required to apply, and the horizontal synchronization signal may indicate the start section of one gate line GL of the display panel 160 to which the scan-on voltage is required to apply. One period of the vertical synchronization signal is one frame period, and one period of the horizontal synchronization signal and the data enable signal is one horizontal period. One frame period may include a plurality of horizontal periods.

The timing controller 110 may generate control signals CTRL1, CTRL2, and CTRL3 based on the input image signal DATA and the input control signal CONT. The timing controller 110 may use the control signals CTRL1, CTRL2, and CTRL3 to control the reference voltage generator 130, the source driver 150, and the gate driver 120.

The reference voltage generator 130 may receive the control signal CTRL1 from the timing controller 110. Further, the reference voltage generator 130 may receive a first pixel drive voltage PVDD from the first power source 180 and receive an input voltage VIN from the second power source 182. The first power source 180 and the second power source 182 are shown as individual integrated circuits; however, in some implementations, the first power source 180 and the second power source 182 may be implemented as one power source module so as to be able to output the first pixel drive voltage PVDD and the input voltage VIN. Further, in FIG. 1, it is shown that the power source 180 outputs the input voltage VIN and the first pixel drive voltage PVDD to the reference voltage generator 130; however, the present disclosure is not necessarily limited thereto, and a DC-to-DC converter or the like may be implemented so as to output at least one of the input voltage VIN and the first pixel drive voltage PVDD to the reference voltage generator 130.

The reference voltage generator 130 may generate a maximum gamma voltage VG_TOP and a minimum gamma voltage VG_BOT, using the input voltage VIN and the first pixel drive voltage PVDD, in response to the control signal CTRL1. The reference voltage generator 130 may include a resistor string, a decoder, a gamma amplifier, and the like in order to generate the maximum gamma voltage VG_TOP and the minimum gamma voltage VG_BOT. The maximum gamma voltage VG_TOP and the minimum gamma voltage VG_BOT may be voltages that are used to generate a plurality of gamma voltages VG to determine the luminance levels of the individual pixels of the display panel 160. The reference voltage generator 130 may output the maximum gamma voltage VG_TOP and the minimum gamma voltage VG_BOT to the gamma voltage generator 140. The gamma voltage generator 140 may generate a plurality of gamma voltages VG based on the maximum gamma voltage VG_TOP and the minimum gamma voltage VG_BOT. For example, the gamma voltage generator 140 may include a resistor string, and output the plurality of gamma voltages VG from the resistor string.

The timing controller 110 may output the control signal CTRL2 to the source driver 150 based on the input image signal DATA. The control signal CTRL2 may include image data meeting the operation condition of the display panel 160.

The source driver 150 may generate a data signal on the image data, using the plurality of gamma voltages VG, in response to the control signal CTRL2, and provide the data signal to the display panel 160 through the plurality of source lines SL. The source driver 150 may include a decoder and a source amplifier to generate a data signal from a plurality of gamma voltages VG.

The display panel 160 may receive the first pixel drive voltage PVDD and a second pixel drive voltage PVSS from the power source 180 and display an image according to a plurality of data signals. The first pixel drive voltage PVDD and the second pixel drive voltage PVSS may be voltages for driving the plurality of pixels 170. The first pixel drive voltage PVDD may be higher than the second pixel drive voltage PVSS. In some implementations, the second pixel drive voltage PVSS may be a ground voltage.

The display panel 160 may include the plurality of pixels 170. The display panel 160 may be a liquid crystal display (LCD), an organic light-emitting diode (OLED) display, an inorganic light-emitting diode (ILED) display, a micro light-emitting diode (μLED) display, an active matrix OLED display (AMOLED), a transparent OLED (TOLED) display, or a combination thereof. The display panel 160 may be coupled to the gate driver 120 through the plurality of gate lines GL, and may be coupled to the source driver 150 through the plurality of source lines SL. In this case, the number of source lines SL may be p, and the number of gate lines GL may be q. p and q may be integers greater than 1. Since each of the plurality of pixels 170 is coupled to a corresponding gate line of the plurality of gate lines GL and a corresponding source line of the plurality of source lines SL, the display panel 160 may include p×q number of pixels 170. The display panel 160 may include wiring for delivering the first pixel drive voltage PVDD to the plurality of pixels 170.

The gate driver 120 may provide gate signals to the display panel 160 through the plurality of gate lines GL in response to the control signal CTRL3. Each gate signal may consist of a combination of a scan-on voltage and a scan-off voltage. The control signal CTRL368 may include a scan start signal, a clock signal, etc. The scan start signal may be a signal for causing a first gate signal for displaying the image of one frame to be generated. The clock signal may be a synchronization signal for sequentially applying gate signals to the plurality of gate lines GL.

In general, when noise, e.g., a ripple, occurs in the first pixel drive voltage PVDD, data signals to be provided to the pixels 170 are generated based on the input voltage VIN. Therefore, even though some pixels 170 receive data signals corresponding to the same gray level, one or more drive transistors of the pixels perform differently due to the differences between the gate voltages and the source voltages (or the drain voltages). Therefore, although some pixels 170 receive data signals corresponding to the same gray level, the currents flowing in light emitting elements of the pixels depend on changes in the first pixel drive voltage PVDD. Accordingly, although some pixels 170 receive data signals corresponding to the same gray level, the pixels emit light with different luminance levels.

To address this problem, the reference voltage generator 130 may also receive the first pixel drive voltage PVDD (input to the display panel 160) and generate the maximum gamma voltage VG_TOP and the minimum gamma voltage VG_BOT, using the input voltage VIN and the first pixel drive voltage PVDD. Accordingly, when the first pixel drive voltage PVDD is changed, the maximum gamma voltage VG_TOP and the minimum gamma voltage VG_BOT may also be changed according to the change in the first pixel drive voltage PVDD. Similarly, since the gamma voltage generator 140 generates the plurality of gamma voltages VG based on the maximum gamma voltage VG_TOP and the minimum gamma voltage VG_BOT, and the source driver 150 provides the data signals to the pixels 170 based on the plurality of gamma voltages VG, when the first pixel drive voltage PVDD is changed, the plurality of gamma voltages VG and the data signals which are generated from the plurality of gamma voltages VG may also be changed. In other words, since the data signals to be input to the pixels 170 reflect the voltage change occurring in the first pixel drive voltage PVDD, when some pixels 170 receive data signals corresponding to the same gray level, the differences between the gate voltages and source voltages (or drain voltages) of the drive transistors of the pixels may be substantially constant. Accordingly, even if the first pixel drive voltage PVDD changes, current flowing in the light emitting elements of pixels 170 receiving data signals corresponding to the same gray level are constant. As a result, the pixels 170 receiving the data signals corresponding to the same gray level emit light with substantially the same luminance level, whereby the display panel 160 can display a high-quality image.

Figure 2:
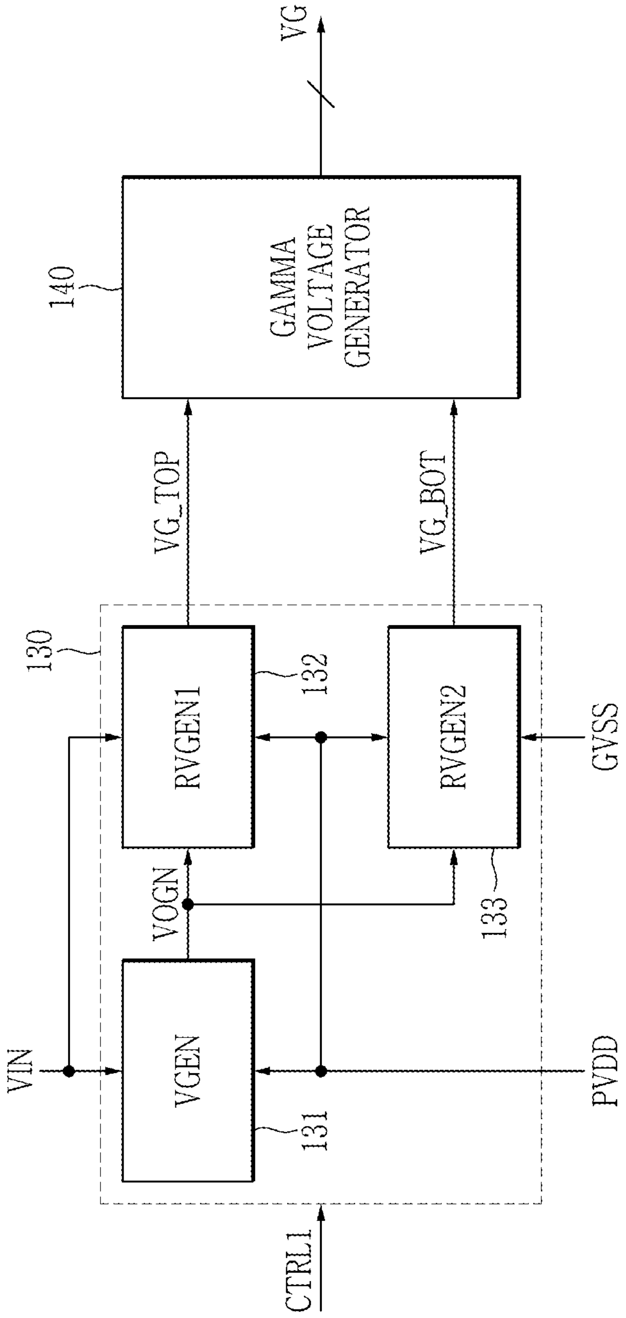
FIG. 2 is a block diagram of an example of a reference voltage generator of the display device of FIG. 1.
Figure 3:
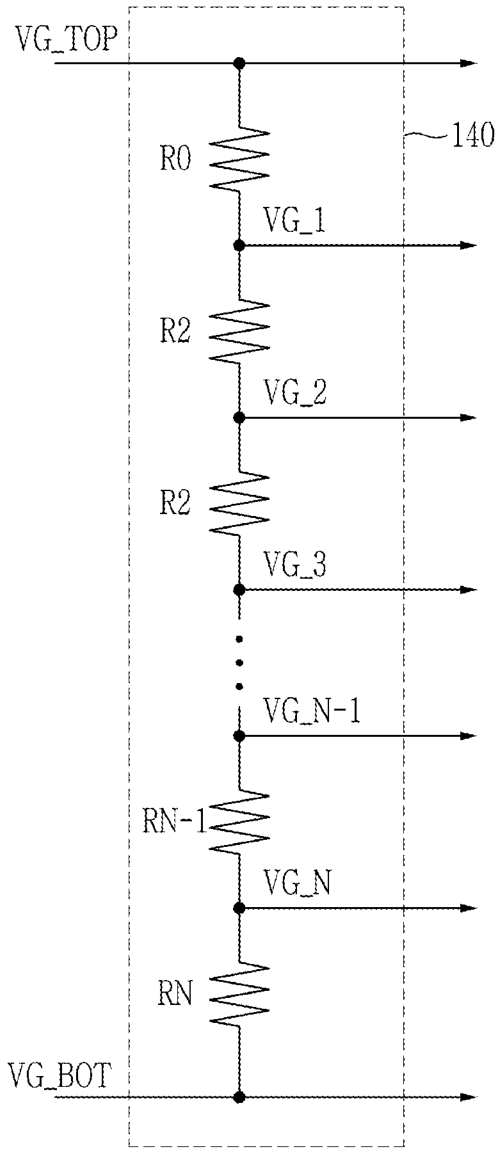
FIG. 3 is a circuit diagram of an example of a gamma voltage generator of the display device of FIG. 1.

FIG. 2 is a block diagram of a reference voltage generator of the display device 10 of FIG. 1, and FIG. 3 is a circuit diagram of a gamma voltage generator.

Referring to FIG. 2, the reference voltage generator 130 may include a voltage generator (VGEN) 131, a first reference voltage generator (RVGEN1) 132, and a second reference voltage generator (RVGEN2) 133.

The voltage generator 131 may generate a voltage VOGN based on the input voltage VIN and the first pixel drive voltage PVDD. For example, the voltage generator 131 may include at least an amplifier, a resistor string, a decoder, and other suitable components to generate the voltage VOGN. Here, the magnitude of the voltage VOGN may be equal to or larger than the magnitude of the first pixel drive voltage PVDD. Further, the magnitude of the voltage VOGN may be equal to or smaller than the magnitude of the input voltage VIN. In other words, the voltage generator 131 may generate the voltage VOGN between the first pixel drive voltage PVDD and the input voltage VIN. The voltage generator 131 may output the voltage VOGN in response to the control signal CTRL1 by changing the resistance value of the resistor string or making the decoder select one voltage. The decoder may be coupled to the resistor string and select one voltage from a plurality of voltages of the resistor string in response to the control signal CTRL1. For example, the voltage generator 131 may be a bandgap reference (BRG) circuit that outputs a constant voltage regardless of changes in the external environment, such as temperature.

The first reference voltage generator 132 may generate the maximum gamma voltage VG_TOP based on the voltage VOGN, the input voltage VIN, and the first pixel drive voltage PVDD. For example, the first reference voltage generator 132 may include a first input terminal that receives the voltage VOGN, a second input terminal that receives the input voltage VIN, a third input terminal that receives the first pixel drive voltage PVDD, and an output terminal that outputs the maximum gamma voltage VG_TOP.

The first reference voltage generator 132 may include an amplifier, a transistor, a resistor string, a buffer, etc. The first reference voltage generator 132 may turn off the transistor or change the resistance value of the resistor string in response to the control signal CTRL1, thereby generating the maximum gamma voltage VG_TOP. The transistor may receive the control signal CTRL1 through the gate terminal, thereby being turned on.

The second reference voltage generator 133 may generate the minimum gamma voltage VG_BOT based on the voltage VOGN, the first pixel drive voltage PVDD, and a drive reference voltage GVSS. In some implementations, the drive reference voltage GVSS may be used as a ground voltage In some implementations, the drive reference voltage GVSS may be equal to the second pixel drive voltage PVSS. The structure of the second reference voltage generator 133 may be the same as the structure of the first reference voltage generator 132. For example, the second reference voltage generator 133 may include a fourth input terminal that receives the voltage VOGN, a fifth input terminal that receives the first pixel drive voltage PVDD, a sixth input terminal that receives the drive reference voltage GVSS, and an output terminal that outputs the minimum gamma voltage VG_BOT. The fourth to sixth input terminals of the second reference voltage generator 133 correspond to the first to third input terminals of the first reference voltage generator 132, respectively.

The second reference voltage generator 133 may include an amplifier, a transistor, a resistor string, a buffer, etc. The second reference voltage generator 133 may turn off the transistor or change the resistance value of the resistor string in response to the control signal CTRL1, thereby generating the minimum gamma voltage VG_BOT. The transistor may receive the control signal CTRL1 through the gate terminal, thereby being turned on.

The first reference voltage generator 132 may output the maximum gamma voltage VG_TOP to the gamma voltage generator 140, and the second reference voltage generator 133 may output the minimum gamma voltage VG_BOT to the gamma voltage generator 140. For example, the first reference voltage generator 132 may output the maximum gamma voltage VG_TOP to one of the input terminals of the gamma voltage generator 140, and the second reference voltage generator 133 may output the minimum gamma voltage VG_BOT to the other input terminal of the gamma voltage generator 140.

The gamma voltage generator 140 may generate a plurality of gamma voltages VG related to a plurality of gray levels, based on the maximum gamma voltage VG_TOP and the minimum gamma voltage VG_BOT, and output the gamma voltages to the source driver 150. For example, the gamma voltage generator 140 may generate a plurality of gamma voltages VG by dividing the voltage between the maximum gamma voltage VG_TOP and the minimum gamma voltage VG_BOT. The maximum gamma voltage VG_TOP may be the highest voltage among the plurality of gamma voltages VG, and the minimum gamma voltage VG_BOT may be the lowest voltage among the plurality of gamma voltages VG. In some implementations, the plurality of gamma voltages VG may not include the maximum gamma voltage VG_TOP and the minimum gamma voltage VG_BOT.

Referring to FIG. 3 together, the gamma voltage generator 140 may include a plurality of resistors R0 to RN (wherein N is an integer greater than 1). The plurality of resistors R0 to RN may be coupled in series so as to form a resistor string. The gamma voltage generator 140 may divide the voltage between the maximum gamma voltage VG_TOP and the minimum gamma voltage VG_BOT, thereby generating first to N-th gamma voltages VG_1 to VG_N. The gamma voltage generator 140 may generate the first to N-th gamma voltages VG_1 to VG_N by dividing the voltage between the maximum gamma voltage VG_TOP and the minimum gamma voltage VG_BOT by the plurality of resistors R0 to RN, and output the first to N-th gamma voltages as the plurality of gamma voltages VG along with the maximum gamma voltage VG_TOP and the minimum gamma voltage VG_BOT.

Figure 4:
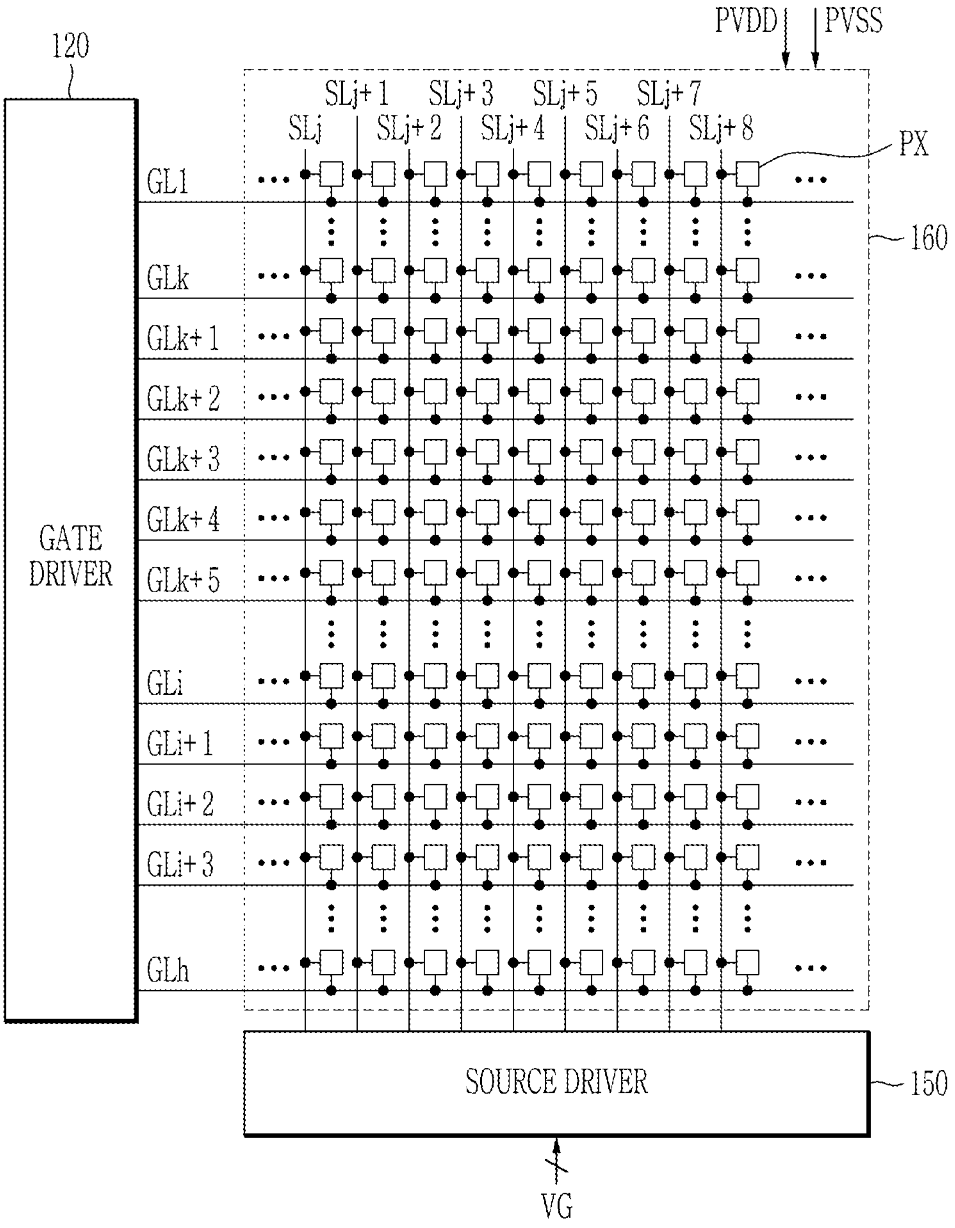
FIG. 4 is a block diagram for explaining the operation of an example of a display panel.
Figure 5:
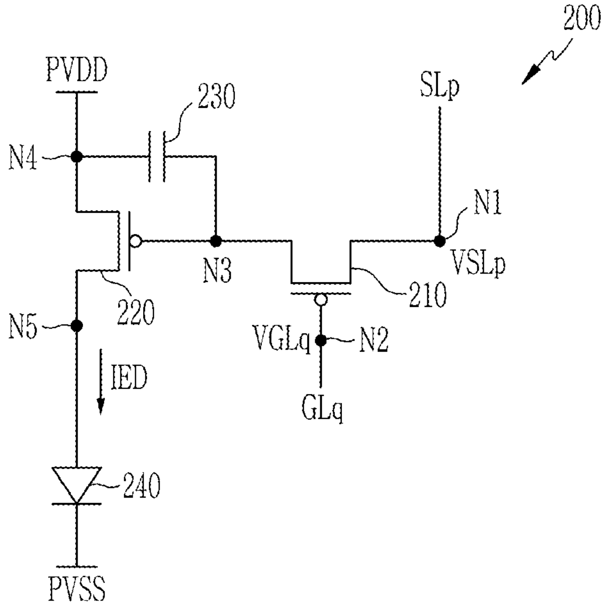
FIG. 5 is a schematic circuit diagram of an example of a pixel.

FIG. 4 is a block diagram for explaining the operation of an example of a display panel, and FIG. 5 is a schematic circuit diagram of an example of a pixel.

Referring to FIG. 4, the display panel 160 may include a pixel array in which the plurality of pixels (PX) is arranged. The plurality of pixels (PX) may be coupled to the gate driver 120 and the source driver 150 through a plurality of gate lines GL1 to GLh and a plurality of source lines SLj to SLj+8, respectively. In FIG. 4, for case of explanation, some gate lines and some source lines are shown, and a part of the display panel 160 in which these gate lines and source lines are coupled is shown. The plurality of gate lines GL1 to GLh may include a first gate line GL1, k-th to (k+5)-th gate lines GLk to GLk+5 (wherein k is an integer greater than 1), i-th to (i+3)-th gate lines GLi to GL+3 (wherein i is an integer greater than 6), and an h-th gate line GLh (wherein h is an integer greater than 9). The plurality of source lines SLj to SLj+8 may include j-th to (j+8)-th source lines SLj to SLj+8 (wherein j is an integer).

The gate driver 120 may receive a first control signal from the timing controller and drive the plurality of gate lines GL1 to GLh in response to the first control signal. In some implementations, the first control signal may contain information on the gate lines, and the gate driver 120 may output different gate signals to the plurality of gate lines GL1 to GLh in response to the first control signal.

The source driver 150 may receive a second control signal from the timing controller and drive the plurality of source lines SLj to SLj+8 in response to the second control signal. The source driver 150 may generate data signals to be output to the plurality of source lines SLj to SLj+8, based on the plurality of gamma voltages VG. For example, the source driver 150 may include an amplifier, a switch, etc. In some implementations, the second control signal may contain information on the source lines, and the source driver 150 may output different data signals to the plurality of source lines SLj to SLj+8 in response to the second control signal.

The plurality of pixels (PX) may display an image based on the gate signals input through the plurality of gate lines GL1 to GLh, the data signals input through the plurality of source lines SLj to SLj+8, and the first and second pixel drive voltages PVDD and PVSS. In this case, since the data signals to be input through the plurality of source lines SLj to SLj+8 are generated based on the first pixel drive voltage PVDD, even if the first pixel drive voltage PVDD changes, the plurality of pixels (PX) may emit light with constant luminance levels. In other words, constant currents flow in the light emitting diodes of the plurality of pixels (PX), so the display panel 160 displays a stable image.

Referring to FIG. 5, a pixel 200 may include transistors 210 and 220, a capacitor 230, and a light emitting diode 240. The light emitting diode 240 may operate based on current IED flowing according to the operations of the transistors 210 and 220 and the capacitor 230.

The transistor 210 may be coupled to the source line SLp coupled to the source driver, at a node N1, and be coupled to the gate line GLq coupled to the gate driver, at a node N2. The source terminal of the transistor 210 may be coupled to the source line SLp, and the gate terminal may be coupled to the gate line GLq, and the drain terminal may be coupled to the gate terminal of the transistor 220. The source line SLp and the gate line GLq may refer to an arbitrary source line (for example, the p-th source line) among the plurality of source lines, and an arbitrary gate line (for example, the q-th gate line) among the plurality of gate lines, respectively. The transistor 210 may receive a voltage VSLp which is a data signal, from the source line SLp through the node N1, and receive a voltage VGLq which is a scan-on voltage, from the gate line GLq through the node N2. The transistor 210 may be coupled to the gate of the transistor 220 at a node N3. The transistor 210 may be turned on in response to the voltage VGLq, thereby delivering the voltage VSLp to the transistor 220.

One of both ends of the capacitor 230 may be coupled to the node N3, and the other end may be coupled to a node N4. The capacitor 230 may be charged based on the difference in voltage between the node N3 and the node N4. The transistor 220 may operate using the charged voltage of the capacitor 230.

The transistor 220 may receive the voltage VSLp from the node N3 through the gate terminal. The transistor 220 may receive the first pixel drive voltage PVDD from the node N4 through the source terminal. The current IED generated based on the difference between the voltage VSLp of the node N3 and the voltage of the node N4 (for example, the first pixel drive voltage PVDD) may flow from the drain terminal of the transistor 220 to the light emitting diode 240. The light emitting diode 240 may be coupled to the transistor 220 at a node N5 that is one end of the light emitting diode, and receive the current IED, and emit light based on the current IED. To the other end of the light emitting diode 240, the second pixel drive voltage PVSS may be applied. The second pixel drive voltage PVSS may be the ground voltage. In this case, even if the first pixel drive voltage PVDD is changed, the voltage VSLp is changed in response to the changed voltage of the first pixel drive voltage PVDD, the difference between the two voltages PVDD and VSLp may be constant and the current IED having a constant magnitude may flow.

In FIG. 5, it is shown that the pixel 200 includes the two transistors 210 and 220; however, the pixel 200 is not necessarily limited thereto, and the pixel 200 may further include additional transistors and capacitors.

Further, in FIG. 5, it is shown that the transistors 210 and 220 are P-channel metal oxide semiconductors (PMOSs); however, the transistors are not necessarily limited thereto, and the transistors 210 and 220 may be implemented in various types such as N-channel metal oxide semiconductors (NMOSs).

FIGS. 6 to 9 are block diagrams for explaining the operation of an example of a display system.

Figure 6:
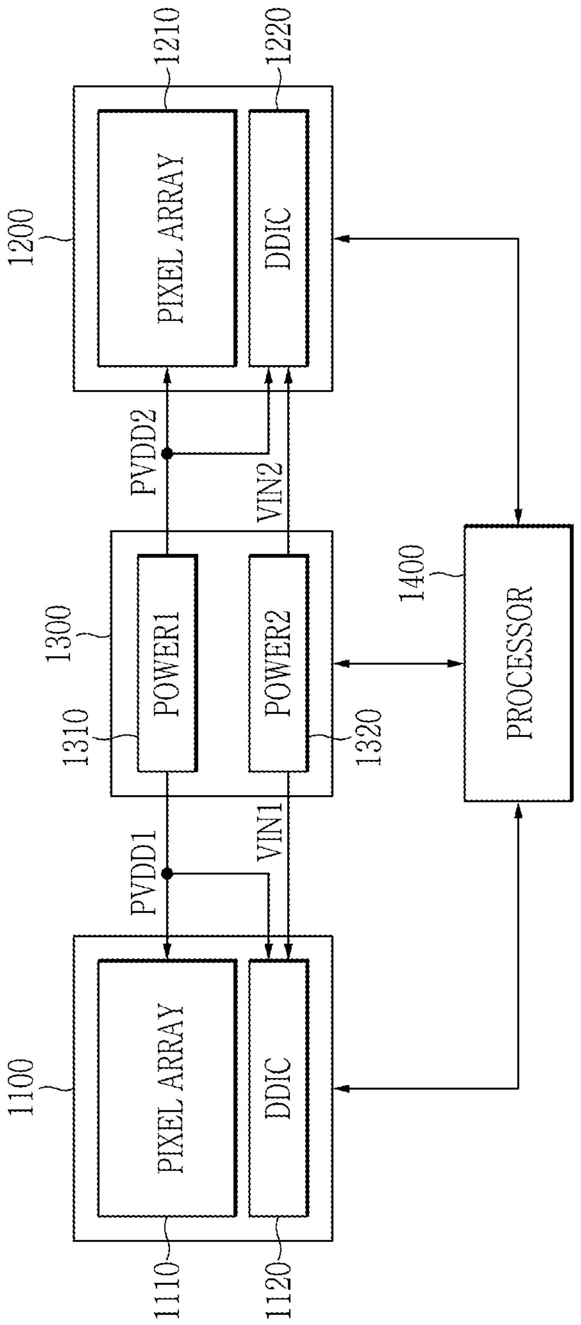
FIGS. 6, 7, 8, and 9 are block diagrams for explaining an example of the operation of a display system.

Referring to FIG. 6, a display system 1000 may provide artificial reality systems, such as virtual reality (VR) systems, augmented reality (AR) systems, mixed reality (MR) systems, hybrid reality systems, or combinations of some of them, and/or derivative systems thereof. Artificial reality systems may be implemented on a variety of platforms including head-mounted displays (HMDs), mobile devices, computing systems, or other hardware platforms capable of providing artificial reality contents to one or more viewers.

The display system 1000 may include a first display device 1100, a second display device 1200, a power source 1300, and a processor 1400. The first display device 1100 and the second display device 1200 may display images to both eyes of a user, respectively. For example, the first display device 1100 may display an image to the left eye of the user, and the second display device 1200 may display an image to the right eye of the user. In some implementations, an image which is displayed by the first display device 1100 and an image which is displayed by the second display device 1200 may be the same or different.

The first display device 1100 may include a pixel array 1110 and a display driver IC (DDIC) 1120. The pixel array 1110 may receive a voltage PVDD1 from a first power source 1310 and display an image based on gate signals and a data signals output from the display driver IC 1120. The pixel array 1110 may include a plurality of pixels.

The display driver IC 1120 may generate gate signals and data signals in response to instructions from the processor 1400. For example, the processor 1400 may transmit image data, a clock signal, and so on to the display driver IC 1120, and the display driver IC 1120 may generate gate signals and data signals based on the image data and the clock signal. The processor 1400 may process data received through a communication module or data read from a storage, thereby generating image data. For example, the processor 1400 may perform encoding, converting, or rendering on the received data.

The display driver IC 1120 may receive the voltage PVDD1 from the first power source 1310 and receive a voltage VIN1 from a second power source 1320. The display driver IC 1120 may generate a data signal based on the voltages PVDD1 and VIN1 and output the data signal to the pixel array 1110. Since the display driver IC 1120 generates data signals using the voltage PVDD1, even if noise occurs in the voltage PVDD1, the data signals uniformly contain noise, and in the pixel array 1110, the potential differences between the source terminals and gate terminals of drive transistors of the pixels are constant. In other words, constant current flow in the light emitting diodes of the pixel array 1110, whereby the first display device 1100 can stably display the image.

The second display device 1200 may include a pixel array 1210 and a display driver IC 1220. The second display device 1200 may operate similarly to the first display device 1100. Accordingly, redundant descriptions will be omitted.

The power source 1300 may include the first power source 1310 that outputs voltages PVDD1 and PVDD2, and the second power source 1320 that outputs voltages VIN1 and VIN2. In some implementations, the voltage PVDD1 may be equal to the voltage PVDD2. The voltage VIN1 may be equal to the voltage VIN2. In some implementations, the power source 1300 may further include additional power sources for supplying power to components of the display system 1000.

The processor 1400 may be a host for controlling the operations of the first and second display devices 1100 and 1200 and the power source 1300. The processor 1400 may transmit first image data to the first display device 1100 and transmit second image data to the second display device 1200. The processor 1400 may transmit the same clock signal to the first and second display devices 1100 and 1200. Accordingly, the first and second display devices 1100 and 1200 may simultaneously display images. The processor 1400 may control the power source 1300 such that the power source 1300 outputs the voltages VIN1, VIN2, PVDD1, and PVDD2.

Figure 7:
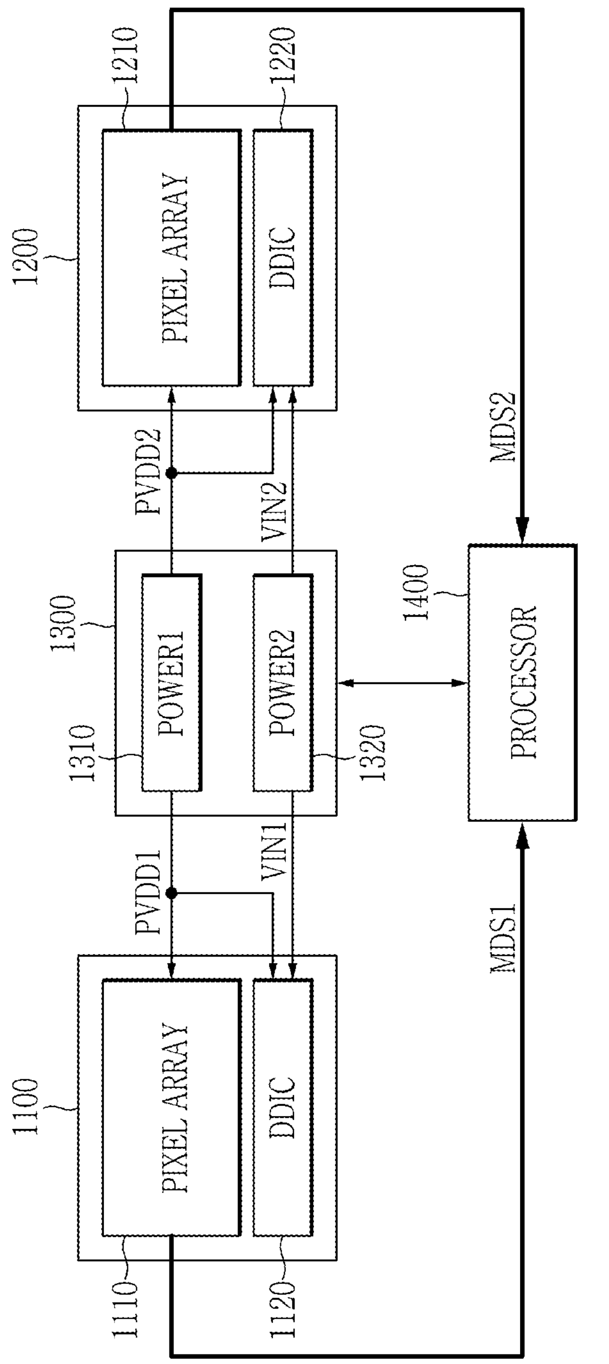

Referring to FIG. 7, the processor 1400 may monitor the voltages of the pixel arrays 1110 and 1210. For example, the processor 1400 may monitor the voltages output from the display driver ICs 1120 and 1220 to the pixel arrays 1110 and 1210. The processor 1400 may perform monitoring by comparing a signal MDS1 received from the pixel array 1110 with a signal MDS2 received from the pixel array 1210. The signal MDS1 may be a signal that is output from the pixel array 1110 when a data signal generated using the voltages PVDD1 and VIN1 by the display driver IC 1120 is input to the pixel array. Similarly, the signal MDS2 may be a signal that is output from the pixel array 1210 when a data signal generated using the voltages PVDD2 and VIN2 by the display driver IC 1220 is input to the pixel array. When the signal MDS1 and the signal MDS2 coincide with each other, the processor 1400 may determine that the display system 1000 is operating normally.

When the signal MDS1 and the signal MDS2 do not coincide with each other, the processor 1400 may determine that an error has occurred in the display system 1000. For example, the potential of the signal MDS1 may be lower than the potential of the signal MDS2. The processor 1400 may detect that the potential of the signal MDS1 is lower than the potential of the signal MDS2 and determine that an error has occurred in the first display device 1100. In some implementations, the processor 1400 may compare the signals MDS1 and MDS2 with a reference potential range. In other words, when the potentials of the signals MDS1 and MDS2 do not agree with the reference potential range within a tolerance, the processor 1400 may determine that an error has occurred.

In some implementations, the processor 1400 may monitor the reference voltages of the display driver ICs 1120 and 1220. For example, the display driver IC 1120 may generate a reference voltage based on the voltages VIN1 and PVDD1, and the display driver IC 1220 may generate a reference voltage based on the voltages VIN2 and PVDD2, and the display driver ICs may generate data signals based on the reference voltages. The processor 1400 may compare the reference voltage of the display driver IC 1120 and the reference voltage of the display driver IC 1220.

Figure 8:
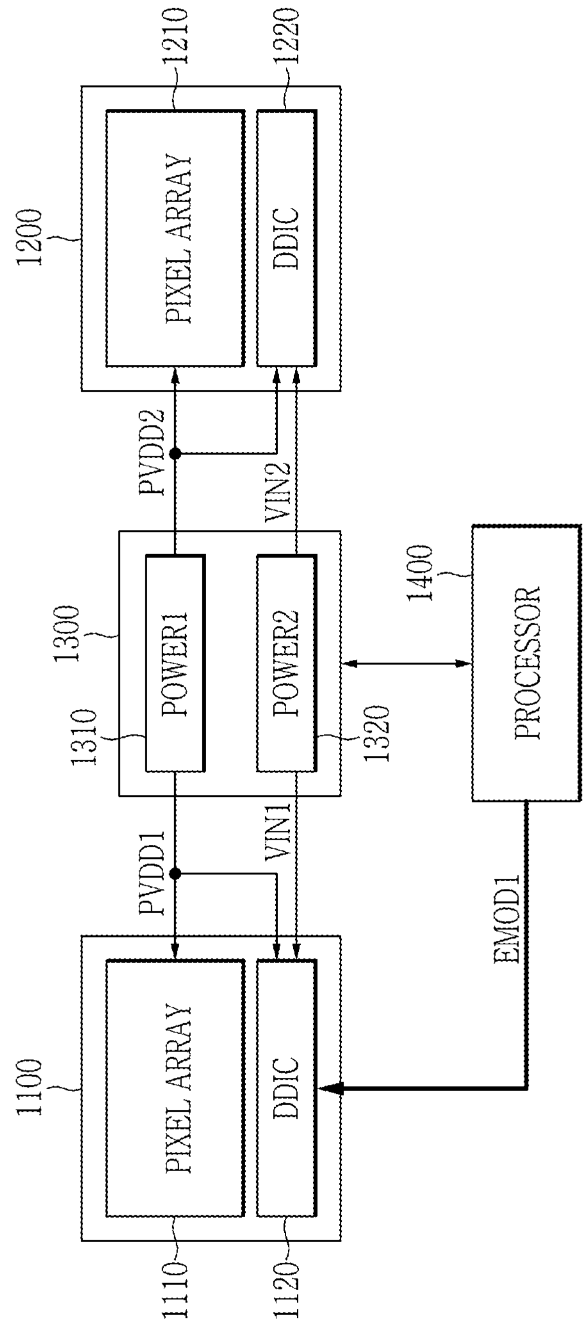

Referring to FIG. 7 and FIG. 8, when determining that an error has occurred in the first display device 1100, the processor 1400 may generate an error correction signal EMOD1 based on the difference in potential between the signals MDS1 and MDS2. In some implementations, the processor 1400 may generate an error correction signal EMOD1 based on the difference between the signal MDS1 and the reference potential range. The processor 1400 may transmit the error correction signal EMOD1 to the display driver IC 1120 of the first display device 1100.

The display driver IC 1120 may change the data signal to be output to the pixel array 1110, based on the error correction signal EMOD1. For example, the display driver IC 1120 may amplify the data signal by a predetermined level. Since the pixel array 1110 outputs an image based on the amplified data signal, the first and second display devices 1100 and 1200 may display images having the same quality.

Figure 9:
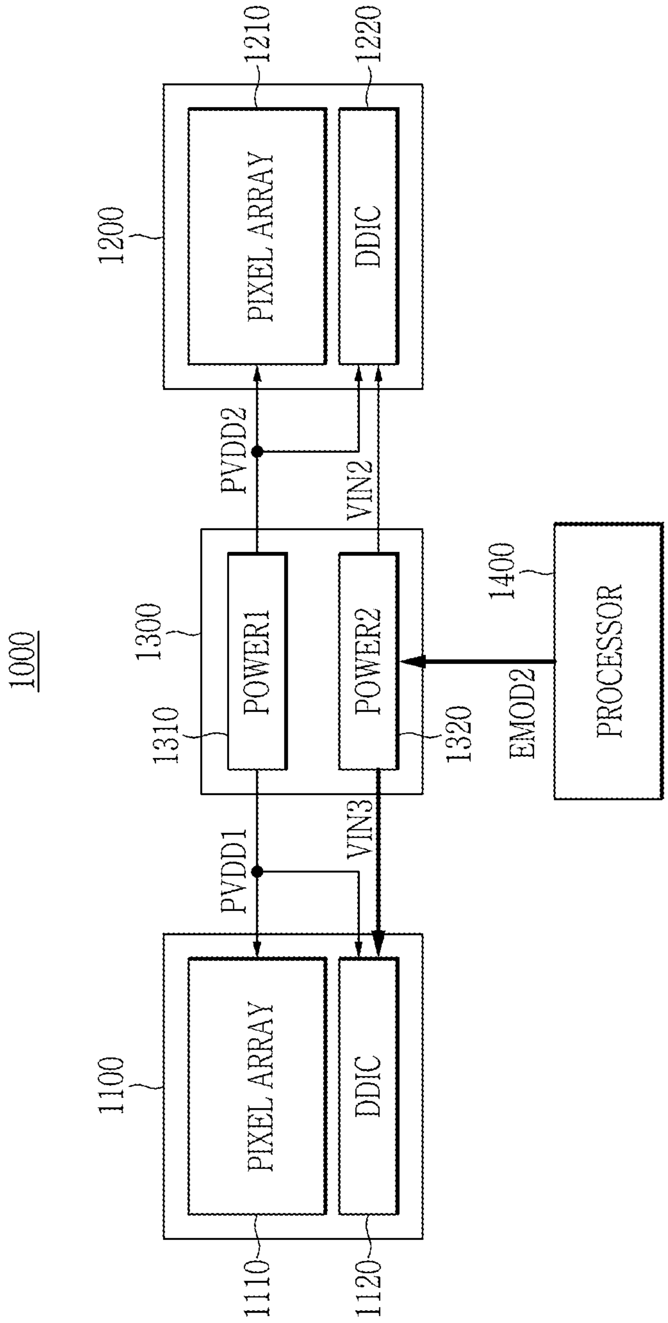

Referring to FIG. 7 and FIG. 9, when determining that an error has occurred in the first display device 1100, the processor 1400 may generate an error correction signal EMOD2 based on the difference in potential between the signals MDS1 and MDS2. In some implementations, the processor 1400 may generate an error correction signal EMOD2 based on the difference between the signal MDS1 and the reference potential range. The processor 1400 may transmit the error correction signal EMOD2 to the second power source 1320.

The second power source 1320 may output a voltage VIN3 based on the error correction signal EMOD2. For example, the second power source 1320 may amplify the voltage VIN1 by a predetermined level, thereby generating the voltage VIN3. The display driver IC 1120 may generate a data signal based on the voltages PVDD1 and VIN3 and output the data signal to the pixel array 1110. The data signal generated based on the voltages PVDD1 and VIN3 may have a potential higher than that of the data signal generated based on the voltages PVDD1 and VIN1. Since the pixel array 1110 outputs images based on data signals having higher potentials, the first and second display devices 1100 and 1200 may display images having the same quality.

The description for FIGS. 6 to 9 explain what happens when the first display device 1100 has an error. A similar description may be applied to when the second display device 1200 has an error.

Figure 10:
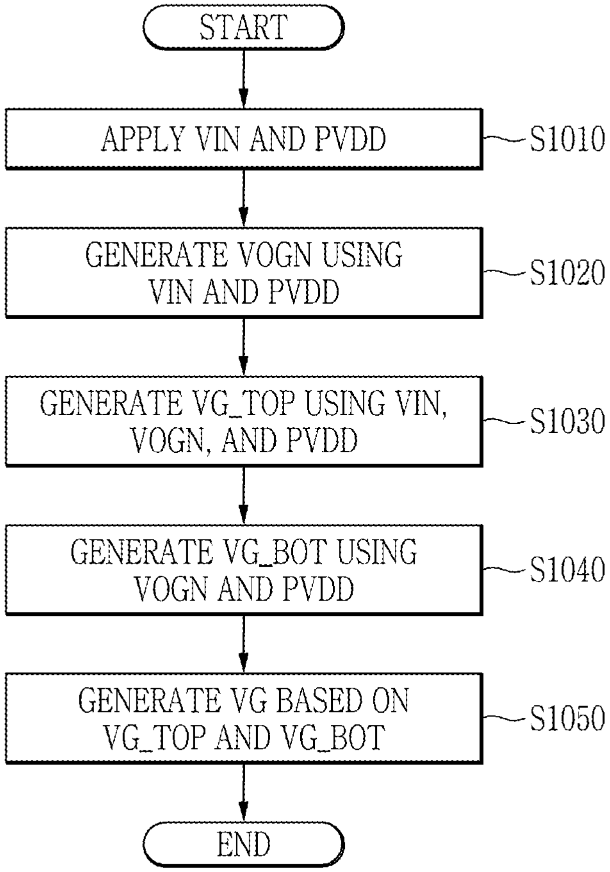
FIG. 10 is a flow chart of an example of a driving method of a display device.

FIG. 10 is a flow chart of a driving method of a display device.

Referring to FIG. 10, the driving method may be performed by a display device. The display device may include a display driver IC and a display panel. The display panel may display images based on gate signals and data signals which are output from the display driver IC.

The display device may apply an input voltage VIN and a pixel drive voltage PVDD (S1010). For example, the display device may include a first power source that generates the input voltage VIN, and a second power source that generates the pixel drive voltage PVDD. In some implementations, the first power source and the second power source may be combined into one power source. In some implementations, the display device may receive the input voltage VIN and the pixel drive voltage PVDD from the outside. The display device may apply the input voltage VIN to the display driver IC and apply the pixel drive voltage PVDD to the display driver IC and the display panel.

The display driver IC may generate a voltage VOGN, using the input voltage VIN and the pixel drive voltage PVDD (S1020). For example, the display driver IC may include a bandgap reference circuit and use the bandgap reference circuit to generate a voltage VOGN lower than the input voltage VIN and higher than the pixel drive voltage PVDD. In some implementations, the display driver IC may generate a voltage VOGN having a first potential level higher than that of the pixel drive voltage PVDD.

The display driver IC may generate a maximum gamma voltage VG_TOP, using the voltage VOGN, the input voltage VIN, and the pixel drive voltage PVDD (S1030). The display driver IC may include a first reference voltage generator for generating a maximum gamma voltage VG_TOP. The first reference voltage generator may generate a maximum gamma voltage VG_TOP by amplifying the voltage VOGN based on the input voltage VIN and the pixel drive voltage PVDD. The first reference voltage generator may include an amplifier, a transistor, a resistor string, a buffer, and so on for generating a maximum gamma voltage VG_TOP.

The display driver IC may generate a minimum gamma voltage VG_BOT, using the voltage VOGN and the pixel drive voltage PVDD (S1040). The display driver IC may include a second reference voltage generator for generating a minimum gamma voltage VG_BOT. The second reference voltage generator may generate a minimum gamma voltage VG_BOT by amplifying the voltage VOGN based on the pixel drive voltage PVDD and the ground voltage. The second reference voltage generator may include an amplifier, a transistor, a resistor string, a buffer, and so on for generating a minimum gamma voltage VG_BOT. The first and second reference voltage generators may have the same structure. A node in the first reference voltage generator to which the pixel drive voltage PVDD is applied may correspond to a node in the second reference voltage generator to which the ground voltage is applied.

The display driver IC may generate a plurality of gamma voltages VG based on the maximum gamma voltage VG_TOP and the minimum gamma voltage VG_BOT (S1050). The display driver IC may include a gamma voltage generator consisting of a resistor string. The display driver IC may output a plurality of gamma voltages VG at nodes on the resistor string. The display driver IC may output the plurality of gamma voltages VG to a source driver, and the source driver may generate data signals based on the plurality of gamma voltages VG, and output the data signals to the display panel.

Figure 11:
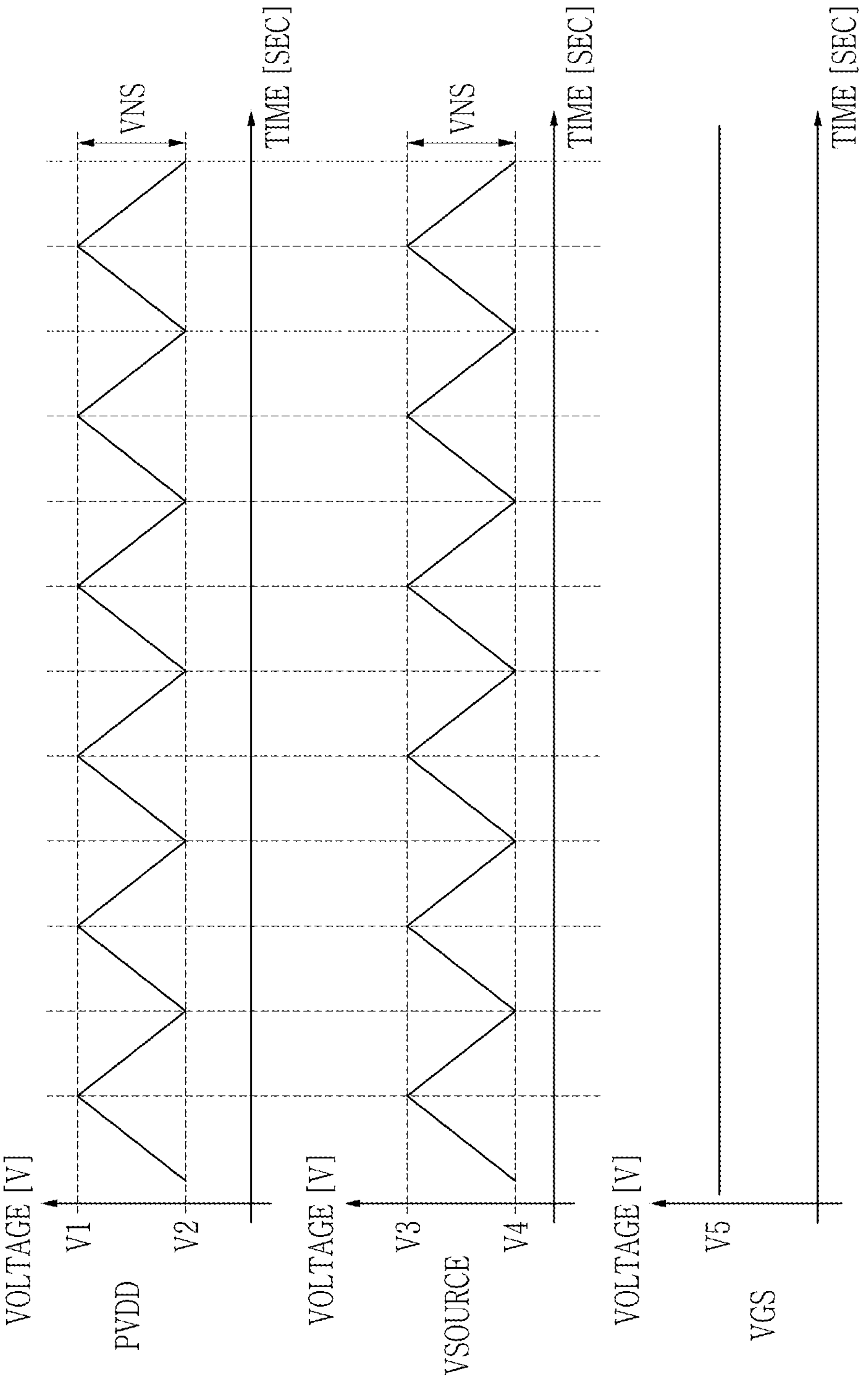
FIG. 11 is a graph for explaining an example of the operation of a display device.

FIG. 11 is a graph for explaining an example of the operation of a display device.

Referring to FIG. 11, a display device may include a display driver IC and a display panel. The display driver IC may output gate signals and data signals to the display panel, and the display panel may display images based on the gate signals and the data signals.

The display panel and the display driver IC may receive a pixel drive voltage PVDD. For example, the display device may receive a pixel drive voltage PVDD from an external power source or may include a power source for generating a pixel drive voltage PVDD. The pixel drive voltage PVDD may have a variation as much as voltage VNS, and its voltage value may fluctuate in a range from V1 to V2.

The display driver IC may generate a voltage VSOURCE corresponding to a data signal based on the pixel drive voltage PVDD. For example, the display driver IC may include an amplifier, a resistor string, a decoder, etc. Accordingly, the voltage VSOURCE which is generated by the display driver IC may have a variation as much as voltage VNS, similar to the pixel drive voltage PVDD. The voltage VSOURCE may fluctuate in a range from V3 to V4. The display driver IC may apply the voltage VSOURCE to the pixels of the display panel through source lines. The pixels may display an image based on the pixel drive voltage PVDD and the voltage VSOURCE.

Each pixel may include a plurality of transistors and a light emitting diode. Among the plurality of transistors, a drive transistor may receive the pixel drive voltage PVDD through its source terminal and receive the voltage VSOURCE through its gate terminal. The drive transistor may flow current to the drain terminal based on the voltage difference VGS between the source terminal and the gate terminal. The voltage difference VGS may be the difference between the pixel drive voltage PVDD and the voltage VSOURCE. Since the pixel drive voltage PVDD and the voltage VSOURCE have the same variation as much as the VNS, noise may be offset, and the voltage difference VGS between these voltages may have a constant value of V5. Accordingly, constant current flows from the drive transistor to the light emitting diode, whereby the light emitting diode can emit light with constant luminance.

Figure 12:
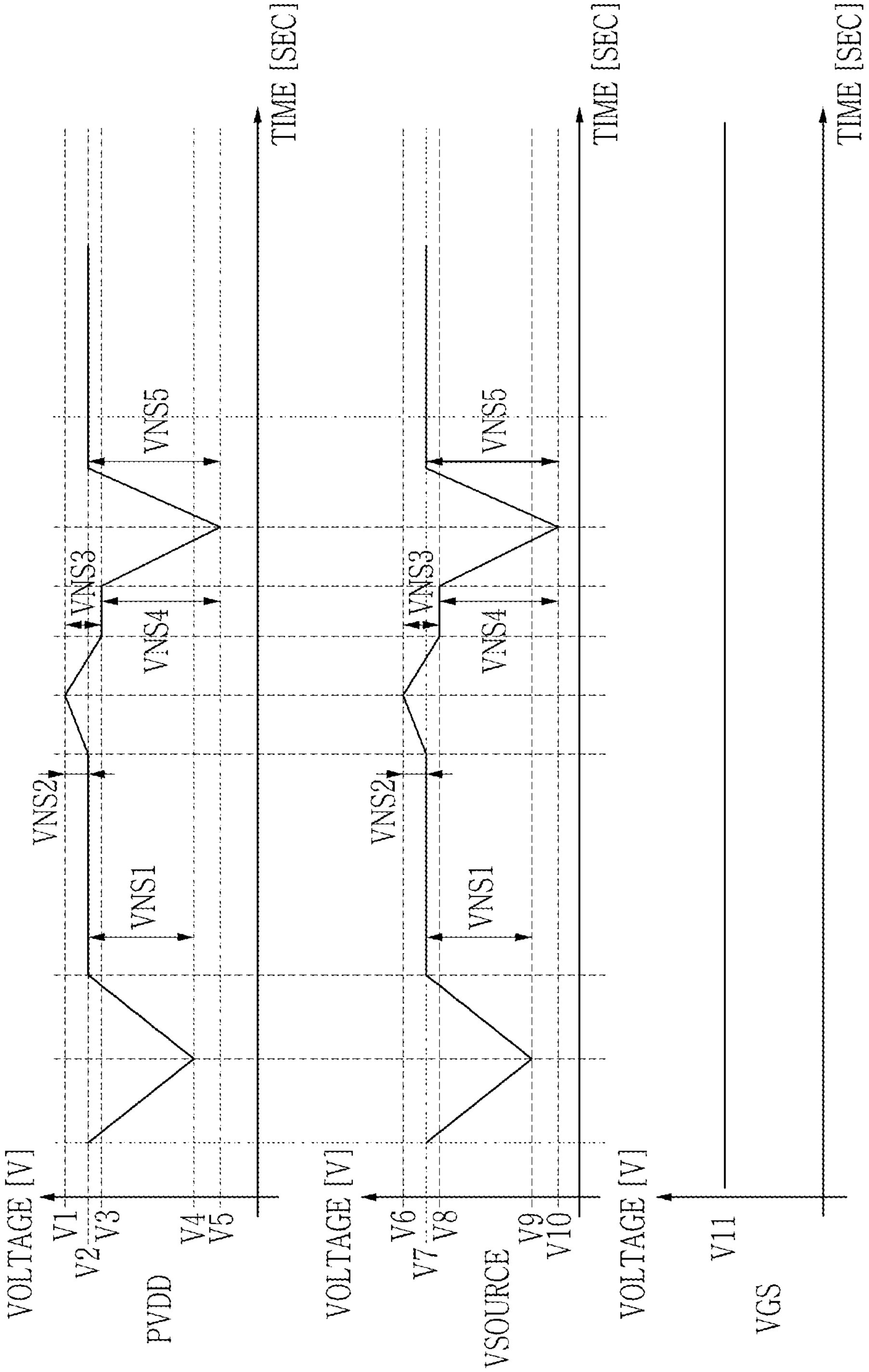
FIG. 12 is a graph for explaining an example of the operation of a display device.

FIG. 12 is a graph for explaining an example of the operation of a display device.

Referring to FIG. 12, a display device may include a display driver IC and a display panel. The display driver IC may output gate signals and data signals to the display panel, and the display panel may display images based on the gate signals and the data signals.

The display panel and the display driver IC may receive a pixel drive voltage PVDD. For example, the display device may receive a pixel drive voltage PVDD from an external power source or may include a power source for generating a pixel drive voltage PVDD. The pixel drive voltage PVDD may have noise VNS1 to VNS5 at different time points, whereby the voltage value may fluctuate in a range from V1 to V5.

The display driver IC may generate a voltage VSOURCE corresponding to a data signal based on the pixel drive voltage PVDD. For example, the display driver IC may include an amplifier, a resistor string, a decoder, or a combination thereof. Accordingly, the voltage VSOURCE which is generated by the display driver IC may have noise VNS1 to VNS5, similar to the pixel drive voltage PVDD. The voltage VSOURCE may fluctuate in a range from V6 to V10. In other words, the voltage VSOURCE and the pixel drive voltage PVDD may have the same noise at the same time point. The display driver IC may apply the voltage VSOURCE to the pixels of the display panel through source lines. The pixels may display an image based on the pixel drive voltage PVDD and the voltage VSOURCE.

Each pixel may include a plurality of transistors and a light emitting diode. Among the plurality of transistors, a drive transistor may receive the pixel drive voltage PVDD through its source terminal and receive the voltage VSOURCE through its gate terminal. The drive transistor may flow current to the drain terminal based on the voltage difference VGS between the source terminal and the gate terminal. The voltage difference VGS may be the difference between the pixel drive voltage PVDD and the voltage VSOURCE. Since the pixel drive voltage PVDD and the voltage VSOURCE have the noise VNS1 to VNS5 at the same point in time, the noise may be offset, and the voltage difference VGS between these voltages may have a constant value of V11. Accordingly, constant current flows from the drive transistor to the light emitting diode, whereby the light emitting diode can emit light with constant luminance.

Figure 13:
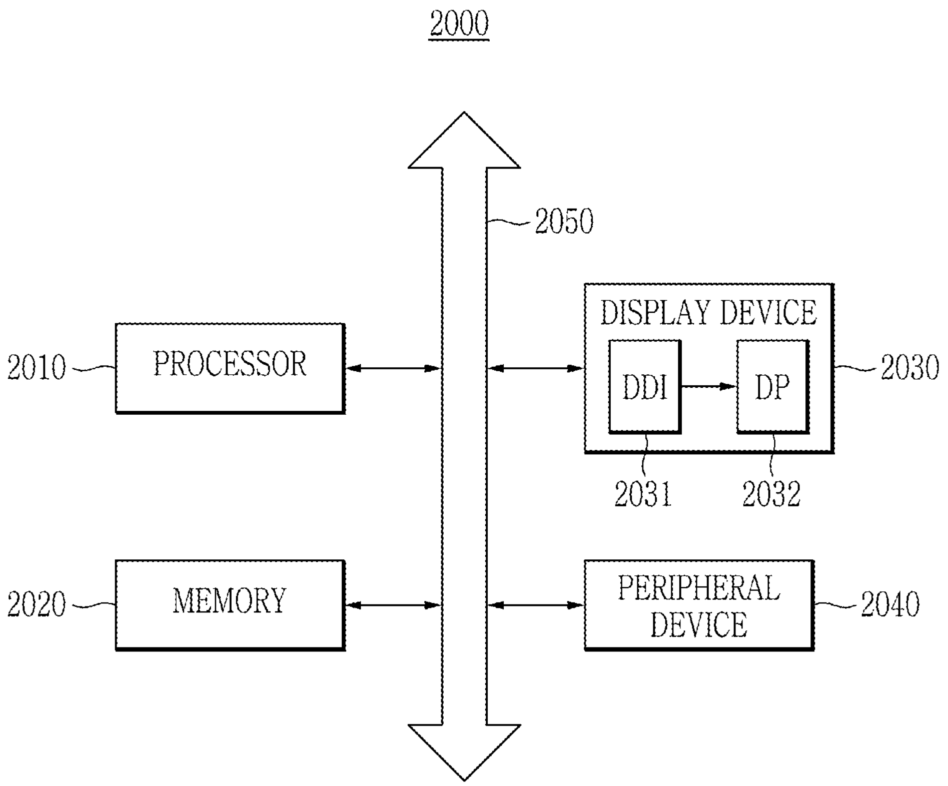
FIG. 13 is a block diagram for explaining an example of a semiconductor system.

FIG. 13 is a block diagram of an example of a semiconductor system.

Referring to FIG. 13, a semiconductor system 2000 may include a processor 2010, a memory 2020, a display device 2030, and a peripheral device 2040, which are electrically coupled by a system bus 2050.

The processor 2010 may control data input and output of the memory 2020, the display device 2030, and the peripheral device 2040, and perform image processing on image data which are transmitted between the corresponding devices.

The display device 2030 may include a display driver IC (DDI) 2031 and a display panel (DP) 2032, and store image data input through the system bus 2050, in a frame memory included in the DDI 2031, and display images on the display panel 2032. In the display device 2030, any of the display devices described with reference to FIG. 1 to FIG. 12 may be incorporated. In other words, the display device 2030 may apply a pixel drive voltage to the DDI 2031 and the DP 2032, and the DDI 2031 may generate data signals using the pixel drive voltage. The DDI 2031 may transmit the data signals to the DP 2032, and the DP 2032 may display images based on the pixel drive voltage and the data signals. When the pixel drive voltage contains noise, the data signals also contain the noise components, the noise components are offset in the drive transistors of the pixels, and constant current flows in the light emitting diodes of the pixels. Therefore, the display device 2030 can display stable images.

The peripheral device 2040 may be a device for converting videos, still images, or the like into electrical signals, such as a camera, a scanner, or webcam. Image data acquired through the peripheral device 2040 may be stored in the memory 2020 or may be displayed on the display panel 2032 in real time.

The memory 2020 may include a volatile memory such as a dynamic random access memory (DRAM) and/or a non-volatile memory such as a flash memory. The memory 2020 may consist of a DRAM, a phase-change random access memory (PRAM), a magnetic random access memory (MRAM), a resistive random access memory (ReRAM), a ferroelectric random access memory (FRAM), a NOR flash memory, a NAND flash memory, a fusion flash memory (e.g., a memory including a static random access memory (SRAM) buffer, a NAND flash memory, and a NOR interface logic), etc. The memory 2020 may store image data acquired from the peripheral device 2040, or may store image signals processed by the processor 2010.

The semiconductor system 2000 may be provided in a mobile electronic product such as a smart phone; but is not limited thereto, and may be provided in various kinds of electronic products that display images.

Figure 14:
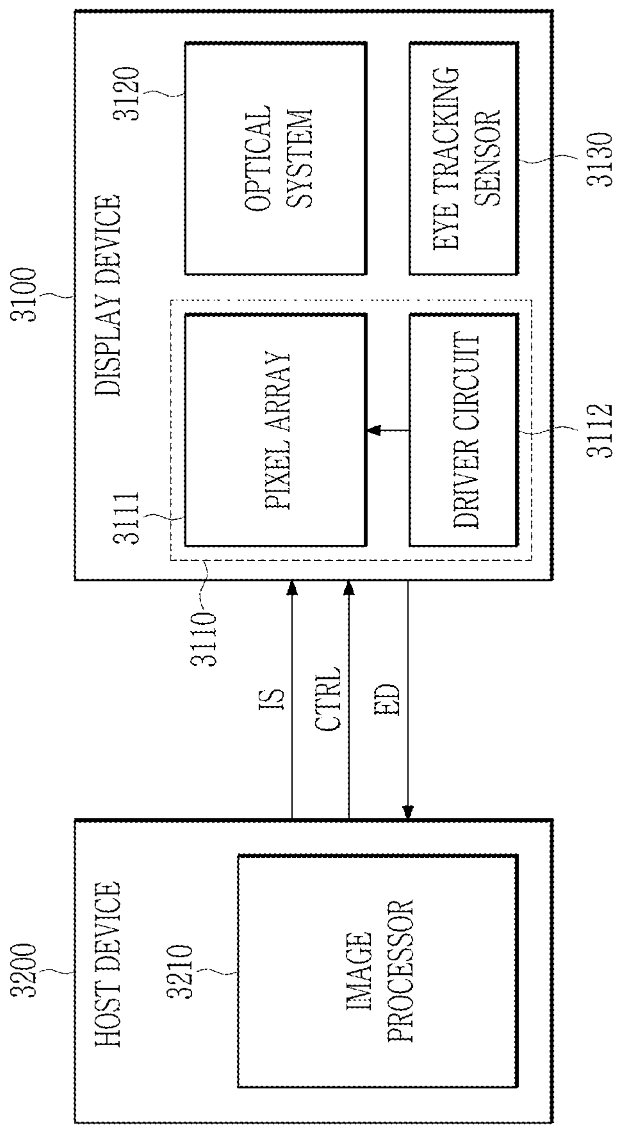
FIG. 14 is a block diagram for explaining an example of a display system.

FIG. 14 is a block diagram of an example of a display system.

Referring to FIG. 14, a display system 3000 may provide artificial reality systems, such as virtual reality (VR) systems, augmented reality (AR) systems, mixed reality (MR) systems, hybrid reality systems, or combinations of some of them, and/or derivative systems thereof. Artificial reality systems may be implemented on a variety of platforms including head-mounted displays (HMDs), mobile devices, computing systems, or other hardware platforms capable of providing artificial reality contents to one or more viewers.

The display system 3000 may include a display device 3100 and a host device 3200. The display device 3100 may receive image data IS transmitted from the host device 3200, and display images according to the image data IS. The display device 3100 may display two-dimensional or three-dimensional images to users. The display device 3100 may include a display panel 3110, an optical system 3120, and an eye tracking sensor 3130. In some implementations, the display device 3100 may further include a power supply circuit, such as a DC-to-DC converter, that supplies drive voltages to the display panel 3110, the optical system 3120, and the eye tracking sensor 3130.

In some implementations, the display panel 3110 may display images to users, according to image data IS received from the host device 3200. In some implementations, the number of display panels 3110 may be one, or two or more. For example, two display panels 3110 may provide images to the eyes of a user, respectively. The display panel 3110 may be a liquid crystal display (LCD), an organic light-emitting diode (OLED) display, an inorganic light-emitting diode (ILED) display, a micro light-emitting diode (μLED) display, an active matrix OLED display (AMOLED), a transparent OLED (TOLED) display, etc.

In some implementations, the display panel 3110 may include a pixel array 3111 and a driver circuit 3112. The display panel 3110 may have a backplane structure in which the pixel array 3111 and the driver circuit 3112 are disposed on a silicon substrate (silicon semiconductor substrate). For example, the display panel 3110 may include a pixel array 3111 and a driver circuit 3112 on a complementary metal-oxide-semiconductor (CMOS) wafer.

The pixel array 3111 may include a plurality of pixels, and a plurality of gate lines and a plurality of source lines coupled to the plurality of pixels, respectively. In some implementations, the plurality of pixels may emit light of predominant colors such as red, green, blue, white, or yellow.

The driver circuit 3112 may generate signals to drive the pixel array 3111, based on image data IS which are received from the host device 3200.

Signals to drive the pixel array 3111 may be transmitted to the plurality of pixels through the plurality of gate lines and the plurality of source lines. In some implementations, the driver circuit 3112 may generate data signals and gate signals to drive the plurality of pixels included in the pixel array 3111 and provide the data signals and the gate signals to the plurality of pixels. The plurality of pixels included in the pixel array 3111 may emit image light based on signals provided by the driver circuit 3112. The pixel array 3111 and the driver circuit 3112 may receive the same pixel drive voltage. The driver circuit 3112 may generate data signals based on the pixel drive voltage. When the pixel drive voltage contains noise, the data signals also contain the noise components, the noise components are offset in the drive transistors of the pixels, and constant current flows in the light emitting diodes of the pixels. Therefore, the display panel 3110 can display stable images.

Images displayed on the display panel 3110 can be visually recognized by the eyes of users through the optical system 3120. In some implementations, the optical system 3120 may optically display image contents or magnify image light received from the display panel 3110, and correct optical errors associated with the image light, and provide the corrected image light to users. For example, the optical system 3120 may include a substrate, optical wave-guides, apertures, Fresnel lenses, convex lenses, concave lenses, filters, input/output couplers, or other suitable optical elements that may affect image light which is emitted from the display panel 3110.

The eye tracking sensor 3130 may track the positions and movements of the eyes of a user. Eye tracking may refer to determining the positions of eyes, including the orientations and positions of the eyes, relative to the display device 3100. In some implementations, an eye tracking system may include an imaging system for imaging one or more eyes. In some implementations, the eye tracking system may include a light emitter that generates light directed at eyes such that light reflected by the eyes can be captured by the imaging system. The eye tracking sensor 3130 may transmit eye tracking data ED to the host device 3200.

The host device 3200 may be a computing device or system that externally controls the display device 3100 such that images desired by a user are displayed on the pixel array 3111. The host device 3200 may transmit image data IS according to a content to be presented to a user, to the display device 3100. In some implementations, the host device 3200 may render a content generated during execution of an application, into image data IS containing a plurality of areas having different display qualities. For example, the image according to the image data IS may include a first area and a second area, and the first area may be rendered at a first quality (for example, high definition), and the second area around the first area may be rendered at a second quality, e.g., low definition.

The host device 3200 may include an image processor 3210 that generates image data IS. In some implementations, the image processor 3210 may generate image data IS containing a plurality of areas having different display qualities. In some implementations, the image processor 3210 may perform rendering of image data IS based on eye tracking data ED received from the display device 3100. The image processor 3210 may receive eye tracking data ED from the eye tracking sensor 3130 and determine the positions of the eyes of the user based on the eye tracking data. For example, the image processor 3210 may render a first area corresponding to the positions of the eyes of the user, at a first quality, and render a second area surrounding the first area, at a second quality.

The host device 3200 may transmit a drive control signal CTRL to the display device 3100. The drive control signal CTRL may contain control insulations, setting data, and the like to control the driver circuit 3112 and the optical system 3120. In some implementations, the drive control signal CTRL may contain area indication data indicating a plurality of areas of an image according to image data IS. In some implementations, the area indication data may include information on the number of areas and/or coordinate data indicating the positions of the plurality of areas in the image represented by the image data IS, function data, etc. For example, when the image represented by image data IS is divided into a first area and a second area, and the first area is rectangular, the area indication data may contain the coordinate values of four vertices of the first area.

The display device 3100 may drive the plurality of areas of the image represented by the image data IS, in a plurality of ways. The plurality of areas may be rendered at a plurality of qualities. For example, the driver circuit 3112 may drive the first area rendered at a first quality and the second area rendered at a second quality, in different ways.

In some implementations, each of the components described with reference to FIGS. 1 to 14, or a combination of two or more components may be implemented as a digital circuit, a programmable or non-programmable logic device or array, an application specific integrated circuit (ASIC), etc.

While this disclosure contains many specific implementation details, these should not be construed as limitations on the scope of what may be claimed. Certain features that are described in this disclosure in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially be claimed as such, one or more features from a combination can in some cases be excised from the combination, and the combination may be directed to a subcombination or variation of a subcombination.

While this invention has been described in connection with what is presently considered to be practical embodiments, it is to be understood that the invention is not limited to the disclosed embodiments. On the contrary, it is intended to cover various modifications and equivalent arrangements included within the spirit and scope of the appended claims.

What is claimed is:

1. A driving method of a display device, the method comprising:

applying an input voltage to a display driver IC;

applying a pixel drive voltage to the display driver IC and a display panel;

generating, using the display driver IC, an initial voltage based on the input voltage and the pixel drive voltage;

generating, using the display driver IC, a data signal based on the initial voltage, the input voltage, and the pixel drive voltage; and displaying, using the display panel, an image based on the data signal and the pixel drive voltage, wherein the initial voltage is lower than the input voltage and higher than the pixel drive voltage.

2. The driving method of the display device of claim 1, wherein generating the data signal based on the initial voltage, the input voltage, and the pixel drive voltage includes:

generating, using the display driver IC, a maximum gamma voltage based on the initial voltage, the input voltage, and the pixel drive voltage;

generating, using the display driver IC, a minimum gamma voltage based on the initial voltage, the pixel drive voltage, and a ground voltage;

generating, using the display driver IC, a plurality of gamma voltages based on the maximum gamma voltage and the minimum gamma voltage; and generating, using the display driver IC, the data signal based on the plurality of gamma voltages.

3. A display device comprising:

a pixel array including a pixel, the pixel including a light emitting diode and a first transistor, the first transistor including:

a source terminal to which a pixel drive voltage is configured to be applied, and a gate terminal to which a data signal is configured to be applied, wherein the first transistor is configured to output, to the light emitting diode, a drive current generated based on a voltage difference between the gate terminal and the source terminal; and a display driver integrated circuit (IC) configured to generate the data signal based on the pixel drive voltage, wherein the display driver IC comprises a voltage generator configured to generate an initial voltage based upon the pixel drive voltage and a circuit drive voltage, and wherein the initial voltage is higher than the pixel drive voltage and lower than the circuit drive voltage.

4. The display device of claim 3, wherein the display driver IC is configured to generate the data signal that has a variation corresponding to a variation in the pixel drive voltage.

5. The display device of claim 3, wherein the pixel further includes a second transistor, the second transistor including:

a drain terminal configured to receive the data signal, and a source terminal that is coupled to the gate terminal of the first transistor and is configured to transmit the data signal to the first transistor.

6. The display device of claim 5, wherein the display driver IC is configured to generate a gate signal and apply the gate signal to the gate terminal of the second transistor, and wherein the second transistor is configured to, based on the gate signal, turn on and transmit the data signal to the first transistor.

7. The display device of claim 3, wherein the display driver IC includes:

a reference voltage generator configured to generate a maximum gamma voltage and a minimum gamma voltage based on the pixel drive voltage and the circuit drive voltage;

a gamma voltage generator configured to generate a plurality of gamma voltages based on the maximum gamma voltage and the minimum gamma voltage; and a source driver configured to generate the data signal based on the plurality of gamma voltages.

8. The display device of claim 7, wherein the reference voltage generator includes:

the voltage generator;

a first reference voltage generator configured to generate the maximum gamma voltage based on the initial voltage, the pixel drive voltage, and the circuit drive voltage; and a second reference voltage generator configured to generate the minimum gamma voltage based on the initial voltage, the pixel drive voltage, and a ground voltage.

9. The display device of claim 8, wherein the first reference voltage generator includes:

a first input terminal configured to receive the initial voltage, a second input terminal configured to receive the circuit drive voltage, and a third input terminal configured to receive the pixel drive voltage, and wherein the second reference voltage generator includes:

a fourth input terminal configured to receive the initial voltage, a fifth input terminal configured to receive the pixel drive voltage, and a sixth input terminal configured to receive the ground voltage, and wherein the first input terminal corresponds to the fourth input terminal, and the second input terminal corresponds to the fifth input terminal, and the third input terminal corresponds to the sixth input terminal.

10. The display device of claim 7, wherein the gamma voltage generator includes a resistor string including a plurality of resistors, and wherein the resistor string is configured to generate the plurality of gamma voltages by receiving the maximum gamma voltage at a first end and receiving the minimum gamma voltage at a second end.

11. A display system comprising:

a power source configured to supply a pixel drive voltage and a circuit drive voltage;

a processor configured to generate first image data and second image data;

a first display device including:

a first display driver IC configured to generate a first data signal based on the first image data, the pixel drive voltage, and the circuit drive voltage, and a first pixel array configured to, based on the pixel drive voltage and the first data signal, display a first image to a first eye of two eyes of a user; and a second display device including:

a second display driver IC configured to generate a second data signal based on the second image data, the pixel drive voltage, and the circuit drive voltage, and a second pixel array configured to, based on the pixel drive voltage and the second data signal, display a second image to a second eye of the two eyes of the user, wherein the processor is configured to receive a first signal from the first pixel array, receive a second signal from the second pixel array, and determine whether the display system is operating normally by comparing the first signal and the second signal.

12. The display system of claim 3, wherein the first signal is a signal output from a source line of the first pixel array based on the first data signal being input to the source line of the first pixel array, and wherein the second signal is a signal output from a source line of the second pixel array based on the second data signal being input to the source line of the second pixel array.

13. The display system of claim 3, wherein the processor is configured to:

based on a potential of the first signal being lower than a potential of the second signal, determine that the first display device is abnormal, and based on the potential of the first signal being higher than that of the second signal, determine that the second display device is abnormal.

14. The display system of claim 3, wherein the processor is configured to:

based on the first signal being lower than a reference value, determine that the first display device is abnormal, and based on the second signal being lower than the reference value, determine that the second display device is abnormal.

15. The display system of claim 3, wherein the processor is configured to transmit an error correction signal to an abnormal display device, and wherein the abnormal display device is configured to output an amplified data signal based on the error correction signal.

16. The display system of claim 3, wherein the processor is configured to transmit an error correction signal to the power source, and wherein the power source is configured to amplify the circuit drive voltage based on the error correction signal, and output the amplified circuit drive voltage to an abnormal display device.

* * * * *